(12) United States Patent
Drake et al.

(10) Patent No.: US 9,298,250 B2
(45) Date of Patent: Mar. 29, 2016

(54) RECONFIGURABLE CIRCUIT TO EMULATE SYSTEM CRITICAL PATHS

(71) Applicant: GLOBALFOUNDRIES INC., Grand Catman (KY)

(72) Inventors: Alan J. Drake, Austin, TX (US); David T. Hui, Poughkeepsie, NY (US); Pawel Owczarczyk, Highland, NY (US); Marshall D. Tiner, Elgin, TX (US); Xiaobin Yuan, Carmel, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 207 days.

(21) Appl. No.: 13/960,017

(22) Filed: Aug. 6, 2013

(65) Prior Publication Data

US 2015/0046721 A1    Feb. 12, 2015

(51) Int. Cl.
*G06F 1/08* (2006.01)
*G06F 1/32* (2006.01)

(52) U.S. Cl.
CPC ...................................... *G06F 1/324* (2013.01)

(58) Field of Classification Search
None
See application file for complete search history.

(56) References Cited

U.S. PATENT DOCUMENTS 6,163,289 A * 12/2000 Ginetti .......................... 341/145
7,576,569 B2    8/2009 Carpenter et al.
2002/0190283 A1   12/2002 Seno et al.
2005/0047040 A1 *  3/2005 Naffziger ........................ 361/90
2009/0031155 A1    1/2009 Hofmann et al.

FOREIGN PATENT DOCUMENTS

JP    2010534890    11/2010
JP    4804620 B2    11/2011

OTHER PUBLICATIONS

Mohamed Elgebaly et al., "Efficient Adaptive Voltage Scaling System Through OnChip Critical Path Emulation", Dept. of Electrical and Computer Engineering, University of Waterloo, Waterloo, Ontario, Canada, 2004, pp. 375-380.

* cited by examiner

*Primary Examiner* — Paul Yanchus, III
(74) *Attorney, Agent, or Firm* — Scully Scott Murphy and Presser (57) ABSTRACT

A circuit for monitoring and controlling a clock signal generated by a clock source in a microprocessor device may include a voltage divider network that provides a plurality of voltages, a selector device that receives the plurality of voltages and provides a scaled supply voltage and a scaled ground voltage from the plurality of voltages, and at least one delay element that receives the scaled supply voltage and the scaled ground voltage and generates a delayed pulse signal by applying a delay to each pulse of the clock signal. The delayed pulse signal may include a delay magnitude that is controllable by the scaled supply voltage and the scaled ground voltage, such that the delayed pulse signal is used to generate a frequency correction signal based on a variation to a supply voltage of the microprocessor. The frequency correction signal may then be applied to the clock source.

20 Claims, 8 Drawing Sheets

RECONFIGURABLE CIRCUIT TO EMULATE SYSTEM CRITICAL PATHS

BACKGROUND a. Field of the Invention

The present invention generally relates to microprocessors, and more particularly to maintaining the performance of such microprocessors using control circuitry.

b. Background of Invention

Microprocessor devices should operate reliably across a variety of environmental conditions. One occurrence associated with microprocessor environments is voltage droop, whereby as a result of, for example, changes in current load, the supply voltage momentarily drops. Voltage droop may in turn affect the maximum operating frequency ($f_{max}$) of the microprocessor compared to the actual frequency at which the microprocessor is being driven. For example, the microprocessor may be operating at a nominal clock frequency of 4.5 GHz, while the maximum operating frequency ($f_{max}$) of the microprocessor may be characterized as being 4.7 GHz. Thus, a guardband of 200 MHz (i.e., 4.7 GHz−4.5 GHz=0.2 MHz) exists.

According to one scenario, a voltage drop may cause the maximum operating frequency ($f_{max}$) of the microprocessor to reduce to 4.6 GHz while the microprocessor continues to operate at the nominal clock frequency of 4.5 GHz. Here, the microprocessor continues to operate within the provided guardband since the nominal frequency (i.e., 4.5 GHz) remains below the $f_{max}$(i.e., 4.6 GHz) of the microprocessor. However, according to another scenario, the voltage drop may be significant enough to cause the maximum operating frequency ($f_{max}$) of the microprocessor to reduce to, for example, 4.3 GHz while the microprocessor continues to operate at the 4.5 GHz nominal frequency. Here, the microprocessor fails to operate within the provided guardband since the nominal frequency (i.e., 4.5 GHz) is now higher than the $f_{max}$ (i.e., 4.3 GHz) of the microprocessor. Therefore, as a result of driving the microprocessor at a nominal frequency (i.e., 4.5 GHz) that is beyond the momentarily reduced $f_{max}$ (i.e., 4.3 GHz) value, the microprocessor operation may fail.

BRIEF SUMMARY

According to one exemplary embodiment, a circuit for monitoring and controlling a clock signal generated by a clock source in a microprocessor device may include a voltage divider network that provides a plurality of voltages, a selector device that receives the plurality of voltages and provides a scaled supply voltage and a scaled ground voltage selectable from the received plurality of voltages, and at least one delay element that receives the scaled supply voltage and the scaled ground voltage and generates a delayed pulse signal by applying a delay to each pulse of the clock signal. The delayed pulse signal may include a delay magnitude that is controllable by the scaled supply voltage and the scaled ground voltage, such that the delayed pulse signal is used to generate a frequency correction signal based on a variation to a supply voltage of the microprocessor. The frequency correction signal may then be applied to the clock source for maintaining a frequency guardband for the clock signal of the microprocessor during the variation to the supply voltage.

According to another exemplary embodiment, a circuit for monitoring and controlling a clock signal generated by a clock source in a microprocessor device may include a voltage divider network that provides a plurality of voltages, a selector device that receives the plurality of voltages and provides a scaled supply voltage selectable from the received plurality of voltages, and a delay path that receives the scaled supply voltage and generates a delayed pulse signal by applying a delay to each pulse of the clock signal. The delayed pulse signal may have a delay magnitude controllable by the scaled supply voltage, such that the delayed pulse signal is used to generate a frequency correction signal based on a variation to a supply voltage of the microprocessor. The frequency correction signal may then be applied to the clock source for maintaining a frequency guardband for the clock signal of the microprocessor during the variation to the supply voltage.

According to an exemplary embodiment, a method of monitoring and controlling a clock signal generated by a clock source in a microprocessor device is provided. The method may include generating a plurality of scaled voltages, selecting at least one scaled voltage from the generated plurality of scaled voltages, applying the at least one scaled voltage to at least one delay element, and delaying each pulse of the clock signal propagating through the at least one delay element based on the selected at least one scaled voltage. The method may further include generating a frequency correction signal from the delaying of each pulse of the clock signal based on a variation to a supply voltage of the microprocessor. The frequency correction signal may then be applied to the clock source for maintaining a frequency guardband for the clock signal of the microprocessor during the variation to the supply voltage.

BRIEF DESCRIPTION OF THE SEVERAL VIEWS OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

The following one or more exemplary embodiments describe emulation circuits that may be present within microprocessor devices. Particularly, the circuits emulate system critical paths across a range of microprocessor supply voltages (i.e., $V_{dd}$), whereby the system critical paths may be paths within the microprocessor design that limit frequency (i.e., the slowest path). The system critical paths may be emulated by one or more delay circuits that create different delay values in response to changes to microprocessor supply voltages (i.e., $V_{dd}$) undesirably caused by, for example, voltage droop. The changes in delay provide a means for sensing voltage droop and accordingly correcting the frequency value of the microprocessor's on-chip clock. This sensing and subsequent adjustment to the microprocessor's on-chip clock frequency maintains an adequate frequency guardband between the actual clock frequency and the maximum operating frequency ($f_{max}$) of the microprocessor. The following describes enhanced systems and methods for sensing and controlling microprocessor on-chip clock frequency based on $f_{max}$ limitations.

Figure 1A:
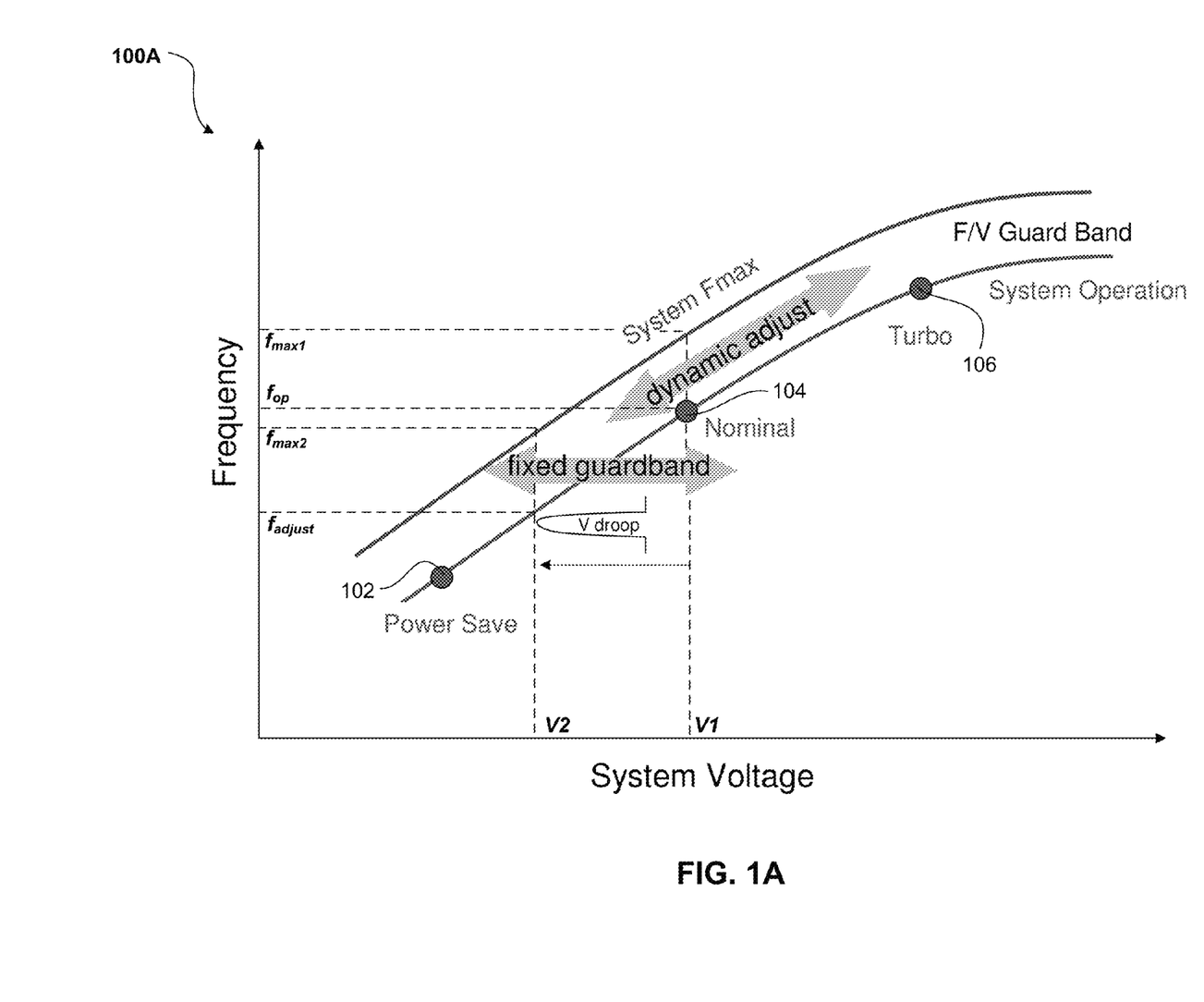
FIG. 1A is a graph showing changes in guardband frequency based on supply voltage variations, according to an exemplary embodiment.

Referring to FIG. 1A, graph 100A shows changes in guardband frequency based on supply voltage variations according to an exemplary embodiment. As depicted, at the supply voltage value of V1, the microprocessor clock may operate at nominal frequency value $f_{op}$, where the $f_{op}$ value has a predetermined lower frequency value than the corresponding $f_{max1}$ frequency at supply voltage V1. The frequency difference between $f_{max1}$ and $f_{op}$ at supply voltage V1 may provide the requisite frequency guardband. However, as a result of voltage droop or other conditions, the voltage supply may fall to V2, which in turn causes the $f_{max1}$ frequency to shift to a lower $f_{max2}$ frequency. As illustrated, if the microprocessor clock continues to operate at nominal frequency value $f_{op}$, since the $f_{op}$ frequency exceeds the $f_{max2}$ frequency, there is no longer a frequency guardband and the microprocessor operation may fail. However, in response to the voltage droop causing the supply voltage to reduce to V2, the nominal frequency value $f_{op}$ of the microprocessor clock may be dynamically adjusted (i.e., reduced) to frequency value $f_{adjust}$. Thus, the frequency guardband may be maintained and, therefore, the microprocessor clock is not operated at or above its operational tolerances given by $f_{max}$. By dynamically controlling the microprocessor clock frequency in response to, for example, voltage droop, the frequency guardband may be maintained across the various power supply ranges corresponding to power-save operation 102 (i.e., lower power supply values), nominal operation 104 (i.e., medium power supply values), and turbo operation 106 (i.e., higher power supply values).

Figure 1B:
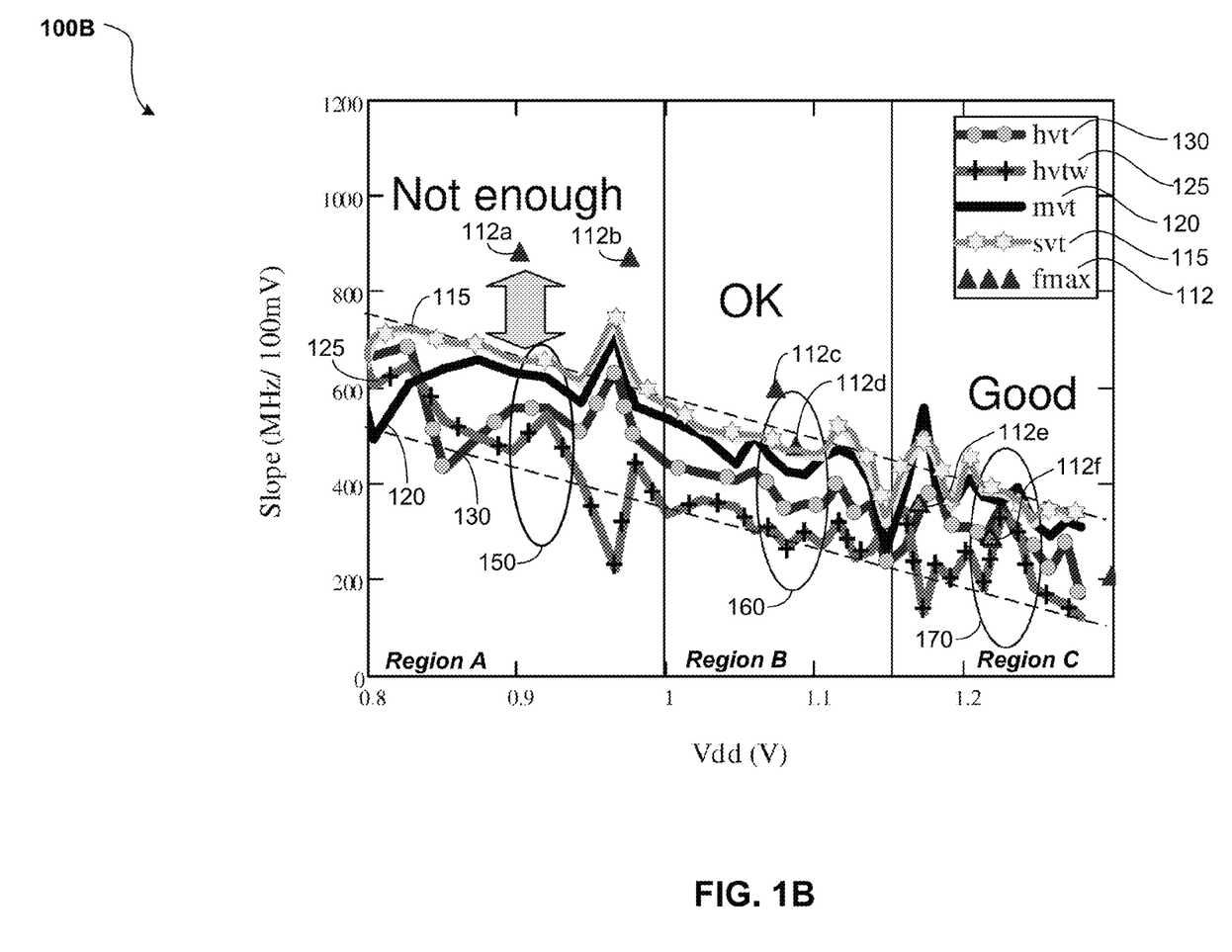
FIG. 1B is a graph depicting $f_{max}$ tracking abilities for different delay paths including a high voltage threshold (HVT) gate delay, a HVT gate and wire delay, a super-high voltage threshold (SVT) gate delay, and a medium voltage threshold (MVT) gate delay, according to one exemplary embodiment.

FIG. 1B is a graph depicting $f_{max}$ tracking abilities for different delay path embodiments including an HVT gate delay, an HVT gate and wire delay, an SVT gate delay, and an MVT gate delay. As indicated, the $f_{max}$ values 112a-112f corresponding to different microprocessor supply voltages are denoted by triangular symbols. Region A includes a range of lower supply voltage values of between about 0.8V-1.0V. Region B includes a range of medium supply voltage values of between about 1.0V-1.15V. Region C includes a range of higher supply voltage values corresponding to a range of about 1.15V-1.3V.

Curve 115 represents the rate of frequency change per voltage (i.e., tracking slope: MHz/100 mV) over the supply voltage range of the microprocessor for a delay path emulating super-high voltage threshold (SVT) transistor devices (e.g., $V_{th}$=0.4V). Curve 120 represents the rate of frequency change per voltage (i.e., tracking slope: MHz/100 mV) over the supply voltage range of the microprocessor for a delay path emulating medium voltage threshold (MVT) transistor devices (e.g., $V_{th}$=0.3V). Curve 125 represents the rate of frequency change per voltage (i.e., tracking slope MHz/100 mV) over the supply voltage range of the microprocessor for a delay path having high voltage threshold transistor devices with wire delay (HVTW). Also, curve 130 represents the rate of frequency change per voltage (i.e., tracking slope: MHz/100 mV) over the supply voltage range of the microprocessor for a delay path emulating high voltage threshold (HVT) transistor devices (e.g., $V_{th}$=0.2V).

Referring to Region A (0.8V-1.0V), the tracking slopes of curves 115, 120, 125, and 130, which correspond to delay paths SVT, MVT, HVTW, and HVT, respectively, do not track $f_{max}$ with much accuracy. As depicted, the slopes of these curves are insufficient to track the $f_{max}$ points. For example, referring to SVT curve 115, at a supply voltage of 0.9V, the SVT delay path has a tracking slope of approximately 700 MHz/100 mV, while a tracking slope of approximately 880 MHz/100 mV is required to track $f_{max}$ point 112a at this supply voltage (i.e., 0.9V). Thus, the $f_{max}$ values 112a, 112b are outside this grouping of curves, as indicated by 150.

Referring to Region B (1.0V-1.15V), the tracking slopes of curves 115, 120, 125, and 130, which correspond to delay paths SVT, MVT, HVTW, and HVT, respectively, to some extent track $f_{max}$ with reasonable accuracy. As depicted, the slopes of some of these curves are reasonably sufficient to track the $f_{max}$ points. For example, referring to SVT curve 115, at a supply voltage of about 1.08V, the SVT delay path has a tracking slope approximately equivalent to that of $f_{max}$ point 112d at this supply voltage (i.e., 1.08V). However, $f_{max}$ point 112c is outside this grouping of curves, as indicated by 160.

Referring to Region C (1.15V-1.3V), the tracking slopes of curves 115, 120, 125, and 130, which correspond to delay paths SVT, MVT, HVTW, and HVT, respectively, track $f_{max}$. As depicted, the slopes of theses curves are sufficient to track the $f_{max}$ points. For example, referring to HVT curve 130, at a supply voltage of about 1.17V, the HVT delay path has a tracking slope approximately equivalent to that of $f_{max}$ point 112e at this supply voltage (i.e., 1.17V). Moreover, at a supply voltage of about 1.22V, the HVTW delay path has a tracking slope approximately equivalent to that of $f_{max}$ point 112f at this supply voltage (i.e., 1.22V). Thus, the $f_{max}$ values are within this grouping of curves, as indicated by 170.

Graph 100B therefore indicates a requisite slope increase for the delay paths emulating $f_{max}$ at the lower supply voltage values, while as the supply voltage increases, an increased tracking slope requirement becomes less. The following circuit embodiments thus provide a means for dynamically adjusting the tracking slope of the one or more delay paths over the entire range of supply voltage utilized by the microprocessor. As described, enhanced tracking of $f_{max}$ may be accomplished by dynamically adjusting the tracking slope of the CPM circuits in accordance with the embodiments described herein.

Figure 2A:
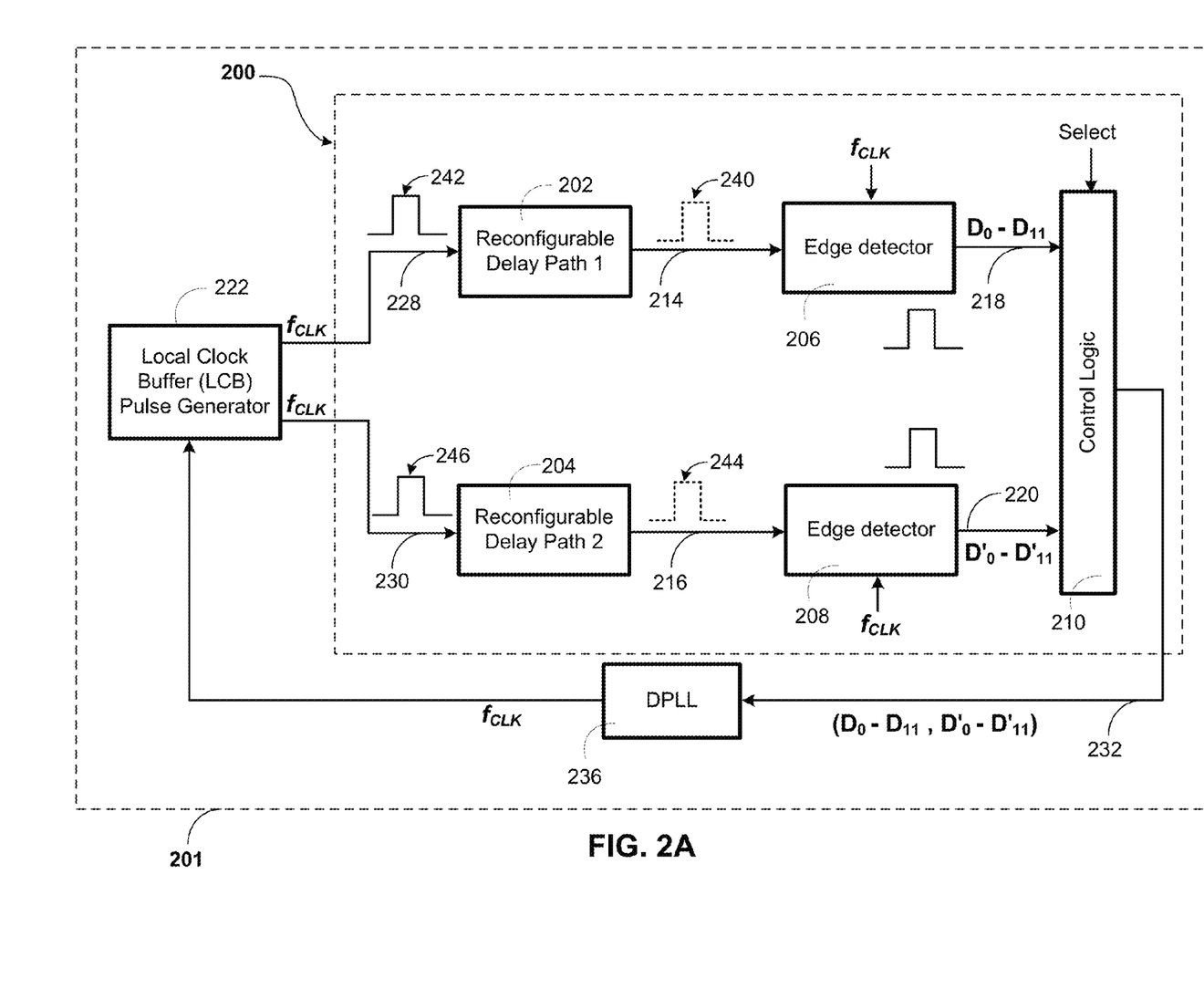
FIG. 2A is control circuit for monitoring and adjusting microprocessor clock frequency based on the $f_{max}$ behavior of the microprocessor according to one embodiment.

Referring to FIG. 2A, a control circuit 200 for monitoring and adjusting microprocessor clock frequency based on the $f_{max}$ behavior of the microprocessor according to one embodiment is depicted. The control circuit 200 may include a first reconfigurable delay path 202, a second (optional) reconfigurable delay path 204, a first edge detector 206 coupled to output 214 of the first reconfigurable delay path 202, a second edge detector 208 coupled to the output 216 of the second reconfigurable delay path 204, and control logic 210 that is coupled to outputs 218 and 220 of the first edge detector 206 and the second edge detector 208, respectively.

As further depicted, a local clock buffer (LCB) pulse generator 222 associated with microprocessor 201 distributes an on-chip microprocessor clock frequency $f_{CLK}$ that is received by inputs 228 and 230 of the first reconfigurable delay path 202 and the second (optional) reconfigurable delay path 204, respectively. Also, output 232 of the control logic 210 is coupled to a digital phase locked loop (DPLL) 236, which generates and adjusts the on-chip microprocessor clock frequency $f_{CLK}$ based on the operation of the control circuit 200, as further described below. The on-chip microprocessor clock frequency $f_{CLK}$ is then input to the LCB pulse generator 222.

The first reconfigurable delay path 202 emulates microprocessor system critical paths across a range (e.g., 0.7V-1.0V) of the microprocessor voltage supply. An exemplary embodiment corresponding to the first reconfigurable delay path 202 is illustrated and described in relation to FIG. 2B. In operation, the first reconfigurable delay path 202 may emulate an SVT path and generate a time delayed clock pulse 240 for each received clock pulse 242 associated with the on-chip microprocessor clock frequency $f_{CLK}$ distributed by the LCB pulse generator 222. This time delayed clock pulse 240 is received and processed by the first 206 edge detector, which based on the magnitude of the delay, generates a multi-bit code also known as a thermometer code (e.g., 12-bit code: $D_0$-$D_{11}$). The multi-bit code (i.e., $D_0$-$D_{11}$) is then used as a frequency correction signal to control the frequency output of the DPLL 236 (i.e., clock source) and thus the on-chip microprocessor clock frequency $f_{CLK}$.

Similarly, the second reconfigurable delay path 204 emulates microprocessor system critical paths across another range (e.g., 1.0V-1.4V) of the microprocessor voltage supply. An exemplary embodiment corresponding to the second reconfigurable delay path 204 is also illustrated and described in relation to FIG. 2B. In operation, the second reconfigurable delay path 204 may emulate an HVT path and generate a time delayed clock pulse 244 for each received clock pulse 246 associated with the on-chip microprocessor clock frequency fax distributed by the LCB pulse generator 222. This time delayed clock pulse 244 is received and processed by the second 208 edge detector, which based on the magnitude of the delay, generates another multi-bit code known as a thermometer code (e.g., 12-bit code: $D'_0$-$D'_{11}$). The multi-bit code (i.e., $D'_0$-$D'_{11}$) is then used as a frequency correction signal to control the frequency output of the DPLL 236 (i.e., clock source) and thus the on-chip microprocessor clock frequency $f_{CLK}$.

Figure 2B:
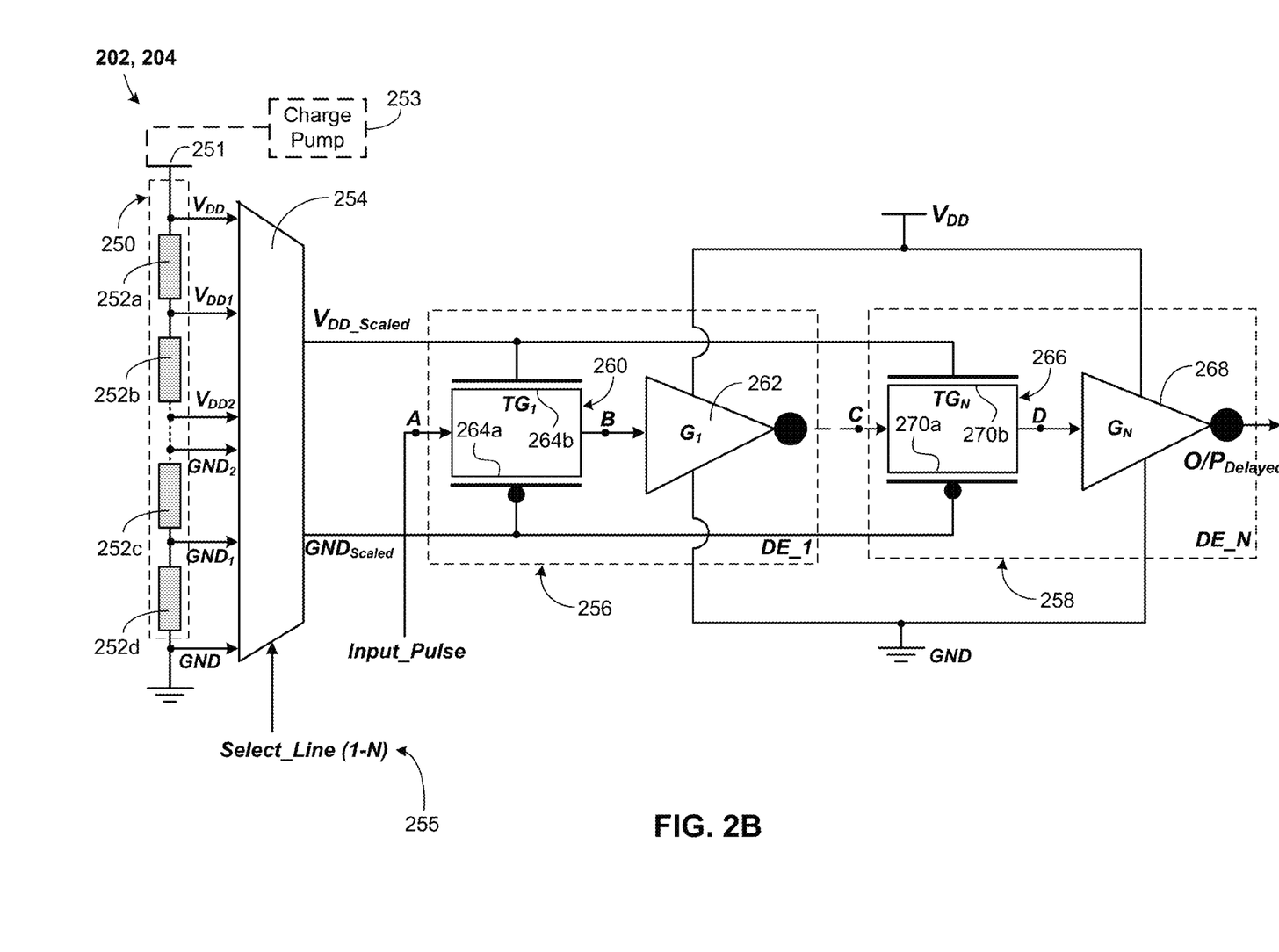
FIG. 2B is an exemplary embodiment of a critical path monitoring (CPM) circuit utilized within the control circuit embodiment depicted in FIG. 2A.

FIG. 2B is an exemplary embodiment of the critical path monitoring (CPM) circuits 202, 204 utilized within the control circuit 200 embodiment depicted in FIG. 2A. The critical path monitoring (CPM) circuits 202, 204 may each include a voltage divider network 250, which includes a plurality of resistors 252a-252d that are connected in series between the digital supply $V_{DD}$ and ground GND. The resistor network 250 scales the voltage of the digital supply $V_{DD}$ to generate, for example, scaled supply voltages $V_{DD1}$, $V_{DD2}$, etc., and scales the ground voltage GND to generate scaled ground voltages $GND_1$, $GND_2$, etc. For example, scaled supply voltage $V_{DD1}$ may include 80% of the digital supply $V_{DD}$, while scaled supply voltage $V_{DD2}$ may include 70% of the digital supply $V_{DD}$. Also, for example, scaled ground voltage $GND_1$ may include 20% above the ground voltage GND, while scaled ground voltage $GND_2$ includes 30% above the ground voltage GND. In the depicted embodiment, the scaled voltages may be selected in complementary scaled supply voltage and ground voltage pairs, whereby, for example, a %90 of $V_{DD}$ is selected with a 10% above GND voltage, a %80 of $V_{DD}$ is selected with a 20% above GND voltage, a %70 of $V_{DD}$ is selected with a 30% above GND voltage, etc. The scaled ground voltages may generally have a voltage value in the range of approximately 0V up to about the supply voltage ($V_{DD}$). The scaled supply voltages may generally have a voltage value in the range of approximately between the supply voltage ($V_{DD}$) down to about 0V.

The critical path monitoring (CPM) circuits 202, 204 also each include a selector device 254 such as a multiplexer that receives the scaled voltages generated by resistor network 250. The selector device 254 includes a select control line 255 that enables the selection of desired complementary scaled supply voltage and ground voltage pairs. For example, if 8-pairs of scaled voltages are generated by the resistor network 250, a 3-bit select line may be needed to controllably select any one of the 8-pairs of scaled voltages. If a pair corresponding to %90 of $V_{DD}$ and 10% above GND voltage is required, the select line 255 may, for example, be set to "001." If a pair corresponding to %80 of $V_{DD}$ and 20% above GND voltage is required, the select line 255 may, for example, be set to "010." If a pair corresponding to %70 of $V_{DD}$ and 30% above GND voltage is required, the select line 255 may, for example, be set to "011," etc.

The critical path monitoring (CPM) circuits 202, 204 further include one or more serially connected delay elements such as delay element 256 (DE_1) and delay element 258 (DE_N). Each delay element introduces a time delay to a pulse signal (i.e., Input_Pulse) that propagates through it. For purposes of illustrative brevity, only the first delay element 256 and the last delay element 258 are depicted. However, between delay elements 256 and 258 any number of delay elements may be provided for emulating critical paths within the microprocessor. Each delay element may include a transmission gate including a PFET and NFET transistor, and an inverter logic gate delay stage. Thus, delay element 256 includes transmission gate 260 and inverter logic gate delay stage 262. Similarly, delay element 258 includes transmission gate 266 and inverter logic gate delay stage 268.

The transmission gate 260 includes PFET device 264a and NFET device 264b, where by switching on both the PFET device 264a and the NFET device 264b, an electrically conductive path is established between terminals A and B of the transmission gate 260. Conversely, by switching off both the PFET device 264a and the NFET device 264b, an electrically non-conductive path is created between terminals A and B. Similarly, transmission gate 266 includes PFET device 270a and NFET device 270b, where by switching on both the PFET device 270a and the NFET device 270b, an electrically conductive path is established between terminals C and D of the transmission gate 266. Conversely, by switching off both the PFET device 270a and the NFET device 270b, an electrically non-conductive path is created between terminals C and D.

As further depicted, each pair of scaled voltages output from the selector device 254 is coupled to each of the delay element transmission gates. Specifically, outputs $V_{DD\_Scaled}$ and $GND_{Scaled}$ of the selector device 254 are coupled to the NFET device and PFET devices of the delay elements, respectively. Thus, output $V_{DD\_Scaled}$ is coupled to both NFET device 264b of transmission gate 260 and NFET device 270b of transmission gate 266. Output $GND_{Scaled}$ is accordingly coupled to both PFET device 264a of transmission gate 260 and PFET device 270a of transmission gate 266.

The selector device 254 may also output a $V_{DD}$ and GND voltage pair as well as each pair of scaled voltages. By scaling the $V_{DD}$ and GND supply voltages that are applied to the transmission gate FET transistors, the tracking slope of the CPM circuits 202, 204 may, however, be increased, especially for delay paths emulating $f_{max}$ at lower supply voltage. Thus, the $f_{max}$ tracking sensitivity of the CPM circuits 202, 204 may be adjusted over a wider range of supply voltages operating within the microprocessor.

Figure 4:
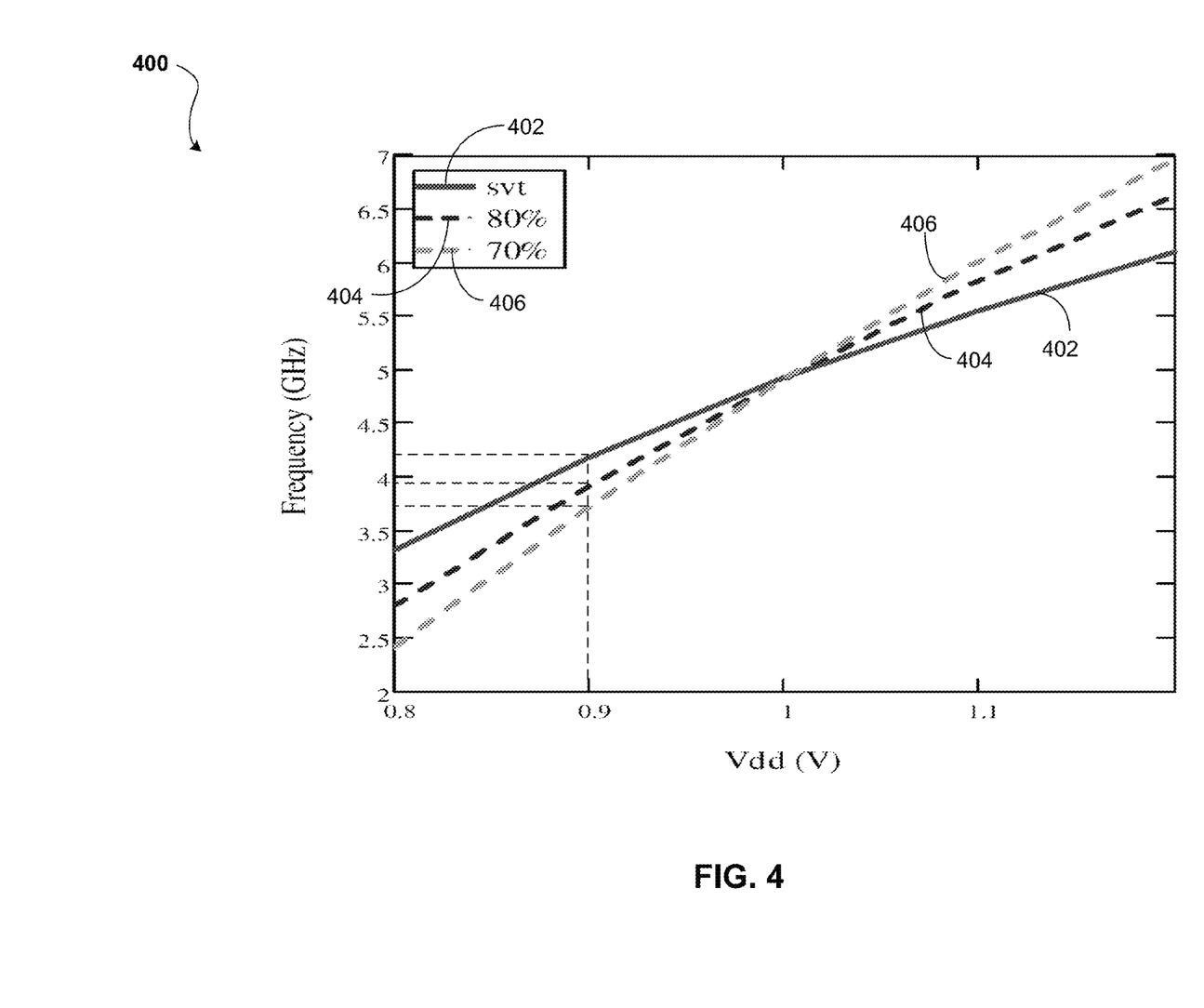
FIG. 4 is a graph showing exemplary frequency tracking slope characteristics for the CPM circuit of FIG. 2B.

This tracking sensitivity capability may be described with the aid of graph 400 depicted in FIG. 4. For example, the delay elements (DE_1 to DE_N) of the CPM circuits 202, 204 may emulate system path delays corresponding to SVT type devices. Curve 402 may illustrate the response or frequency sensitivity exhibited by the CPM circuits 202, 204 per changes in supply voltage based on the delay element transmission gates being driven by the $V_{DD}$ and GND voltage pair. However, as described above in relation to FIG. 1B, for the lower voltage supply region (Region A: Power Save), there is insufficient slope for the SVT response curve to track $f_{max}$.

Referring to FIG. 4, as indicated by curve 404, by scaling the supply voltages (e.g., $V_{DD}$=1.0V & GND=0V) to %80 of $V_{DD}$ (i.e., (0.8V) and 20% above GND voltage (i.e., 0.2V), the CPM circuits 202, 204 facilitate an increase in tracking slope. For example, for a voltage droop causing the voltage to decrease from 0.9V to 0.8V, SVT curve 402 (no voltage scaling) undergoes an approximately 0.95 GHz frequency change. In contrast, for the same voltage droop causing the voltage to decrease from 0.9V to 0.8V, SVT curve 404 (80% voltage scaling) undergoes an approximately 1.1 GHz frequency change. Also, for the same voltage droop causing the voltage to decrease from 0.9V to 0.8V, SVT curve 406 (70% voltage scaling) undergoes an approximately 1.35 GHz frequency change. Thus, the down scaling of the supply voltages applied to the transmission gates of the delay elements provides an increased tracking sensitivity for the CPM circuits 202, 204. By adjusting the slope, the CPM circuits may also cover a wider supply voltage range, which accordingly mitigates the need for multiple reconfigurable delay paths provided by the CPM circuits 202, 204. By increasing the delay paths to cover different supply ranges and corresponding tracking slopes, more real estate within the microprocessor is occupied, as well as increased power consumption. The exemplary CPM circuit embodiments 202, 204 thus enable the use of less path delays (e.g., FIG. 2A: 202, 204) by having configurable tracking sensitivity and, therefore, among other things, less real estate and power is consumed within the microprocessor.

Referring back to FIG. 2B, during normal operation whereby no voltage droop is experienced, the delay path resulting from delay elements DE_1 to DE_N of each of the CPM circuits 202, 204 introduce a known predetermined delay. More specifically, since output $V_{DD\_Scaled}$ is coupled to both NFET device 264b of transmission gate 260 and NFET device 270b of transmission gate 266, and output $GND_{Scaled}$ is coupled to both PFET device 264a of transmission gate 260 and PFET device 270a of transmission gate 266, both transmission gates 260, 266 and any other gates therebetween are conducting. Thus, each pulse corresponding to the microprocessor clock signal, as indicated by Input_Pulse, is received at terminal A of transmission gate 260 at delay element 256 (i.e., DE_1). Each pulse may then propagate through both transmission gate 260 and inverter logic gate delay 262 at delay element 256 (i.e., DE_1) and through that of all subsequent delay elements until the pulses are output from the last delay element 258. At the last delay element 258 (i.e., DE_N) in the delay path, each pulse therefore propagates through both transmission gate 266 and inverter logic gate delay 268 prior to being received at the output of the inverter logic gate delay 268, as indicated by $O/P_{Delayed}$.

Within each delay element, the inverter logic gates introduce a fixed delay, while the transmission gates each introduce a variable delay that changes based on the supply voltages that are applied to their respective NFET and PFET gate inputs. As described above, during normal operation whereby no voltage droop is experienced, the delay path resulting from delay elements DE_1 to DE_N of each of the CPM circuits 202, 204 introduce a known predetermined delay based on set supply voltages governed by $V_{DD\_Scaled}$ and $GND_{scaled}$. This predetermined delay experienced by each pulse at output $O/P_{Delayed}$ is utilized along with the non-delayed version of these pulses by the edge detectors 206, 208 (FIG. 2A) to generate the multi-bit codes that control the DPLL 236 (FIG. 2A) and thus the microprocessor clock frequency via LCB clock generator 222 (FIG. 2A).

Upon the occurrence of voltage droop on the supply voltages, the $V_{DD\_Scaled}$ and $GND_{Scaled}$ also drop. This voltage drop is therefore experienced at the NFET and PFET gate inputs of delay elements DE_1 to DE_N of respective transmission gates $TG_1$ to $TG_N$, which causes the delay elements DE_1, DE_N to further introduce an additional time delay to that of the predetermined delay for each pulse. As described above in relation to FIG. 1A, when voltage droop occurs, the microprocessor clock frequency should also be backed-off to maintain the frequency guardband. Thus, the additional time delay is utilized by the edge detectors 206, 208 (FIG. 2A) to generate the multi-bit codes and reduce the microprocessor clock frequency via LCB clock generator 222 (FIG. 2A).

Figure 2C:
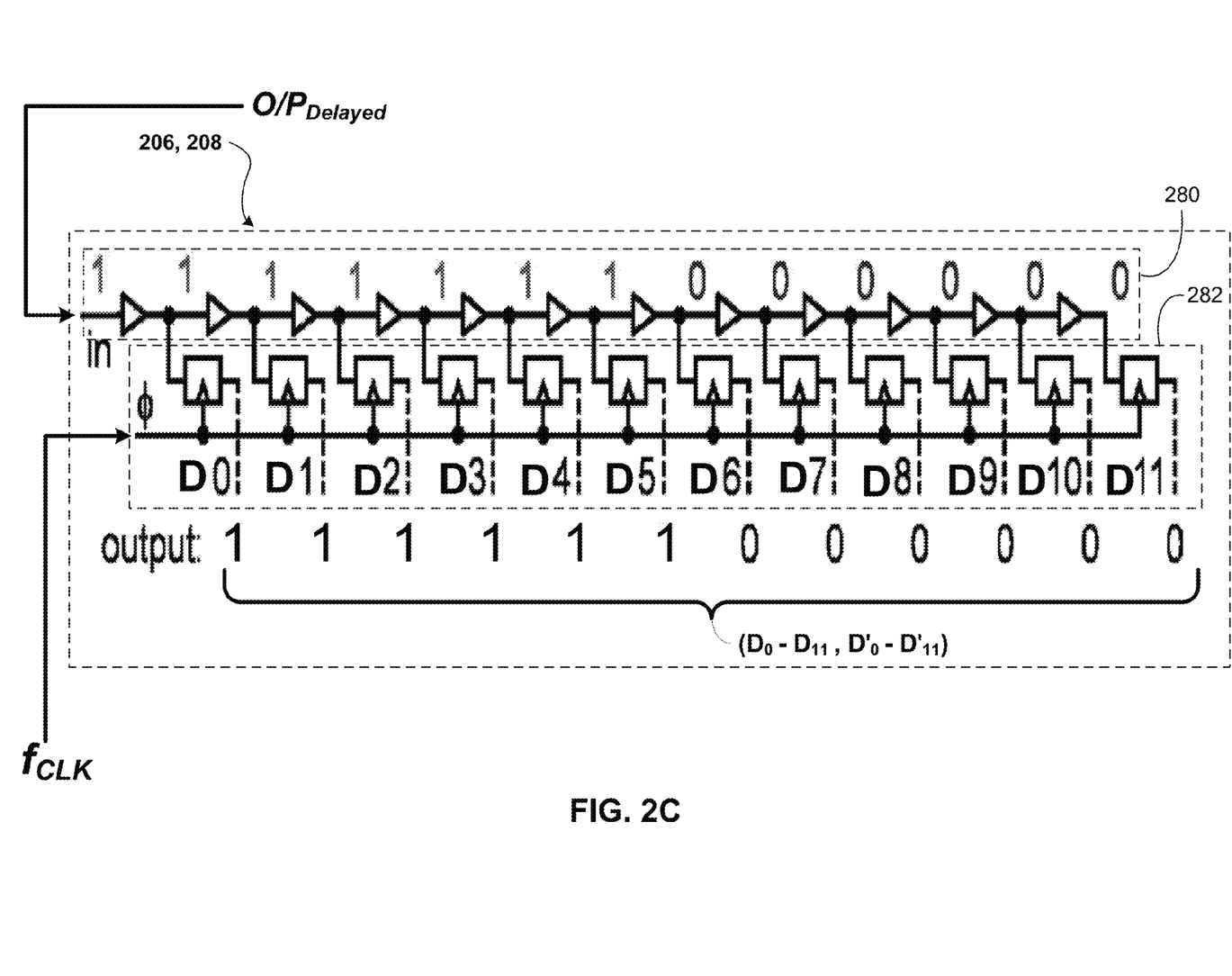
FIG. 2C is an exemplary embodiment of an edge detector circuit utilized within the control circuit embodiment depicted in FIG. 2A.

FIG. 2C is an exemplary embodiment of an edge detector circuit 206, 208 utilized within the control circuit embodiment depicted in FIG. 2A. Each edge detector circuit 206, 208 may include a bank of delay gates 280 and a bank of flip-flops 282 coupled to the bank of delay gates 280. As depicted, the output of each delay gate corresponding to the bank of delay gates 280 is coupled to the input of each corresponding flip-flop associated with the bank of flip-flops 282. The output of the bank of flip-flops 282 provides the multi-bit code (D0-D11) that may be used to control the DPLL 236 (FIG. 2A) frequency.

Each delayed pulse received from output $O/P_{Delayed}$ (also see FIG. 2B) is received by the bank of delay gates 280 as an input. Also, the non-delayed version of the microprocessor clock pulses, as indicated by $f_{CLK}$, are received as a clock input to the bank of flip-flops 282. In operation, based on the time delay difference between each non-delayed microprocessor clock pulse fax and each delayed pulse received from output $O/P_{Delayed}$ (also see FIG. 2B) of one of the CPM circuits 202, 204, a corresponding number of 'logic 1' values are generated at some of the outputs of the bank of delay gates 280.

For example, during normal operation whereby no voltage droop is experienced, the delay path resulting from delay elements DE1_1 to DE_N (FIG. 2B) of each of the CPM circuits 202, 204 (FIG. 2B) introduce a known predetermined delay compared to $f_{CLK}$. This known predetermined delay may cause each delayed pulse at $O/P_{Delayed}$ to propagate along the bank of delay gates 280 during each pulse period of $f_{CLK}$. For example, based on the known predetermined delay, each delayed pulse at $O/P_{Delayed}$ may propagate along six gates within the bank of delay gates 280, and thus, generate a D0-D11 multi-bit code of "111111000000." This multi-bit code of "111111000000" when applied to the DPLL 236 (FIG. 2A) may generate a nominal clock frequency (e.g., 4.5 GHz).

However, during voltage droop, an additional delay may be generated and experienced by each delayed pulse at $O/P_{Delayed}$. Consequently, each delayed pulse at $O/P_{Delayed}$ may propagate less along the bank of delay gates 280 during each pulse period of $f_{CLK}$. Thus, a D0-D11 multi-bit code of "111110000000" may be generated. This multi-bit code of "111111000000" when applied to the DPLL 236 (FIG. 2A) may generate a clock frequency (e.g., 4.35 GHz) that is less than the nominal clock frequency (e.g., 4.5 GHz) in response to the voltage droop. Conversely, when the supply voltage recovers from this voltage droop, the additional delay generated and experienced by each delayed pulse at O/P$_{Delayed}$ is also alleviated. Thus, each delayed pulse at O/P$_{Delayed}$ may once again propagate further along the bank of delay gates 280 during each pulse period of f$_{CLK}$. Thus, the D0-D11 multi-bit code is restored back to "111111000000," which in turn increases the clock frequency back to the nominal clock frequency (e.g., 4.5 GHz) value.

Figure 3:
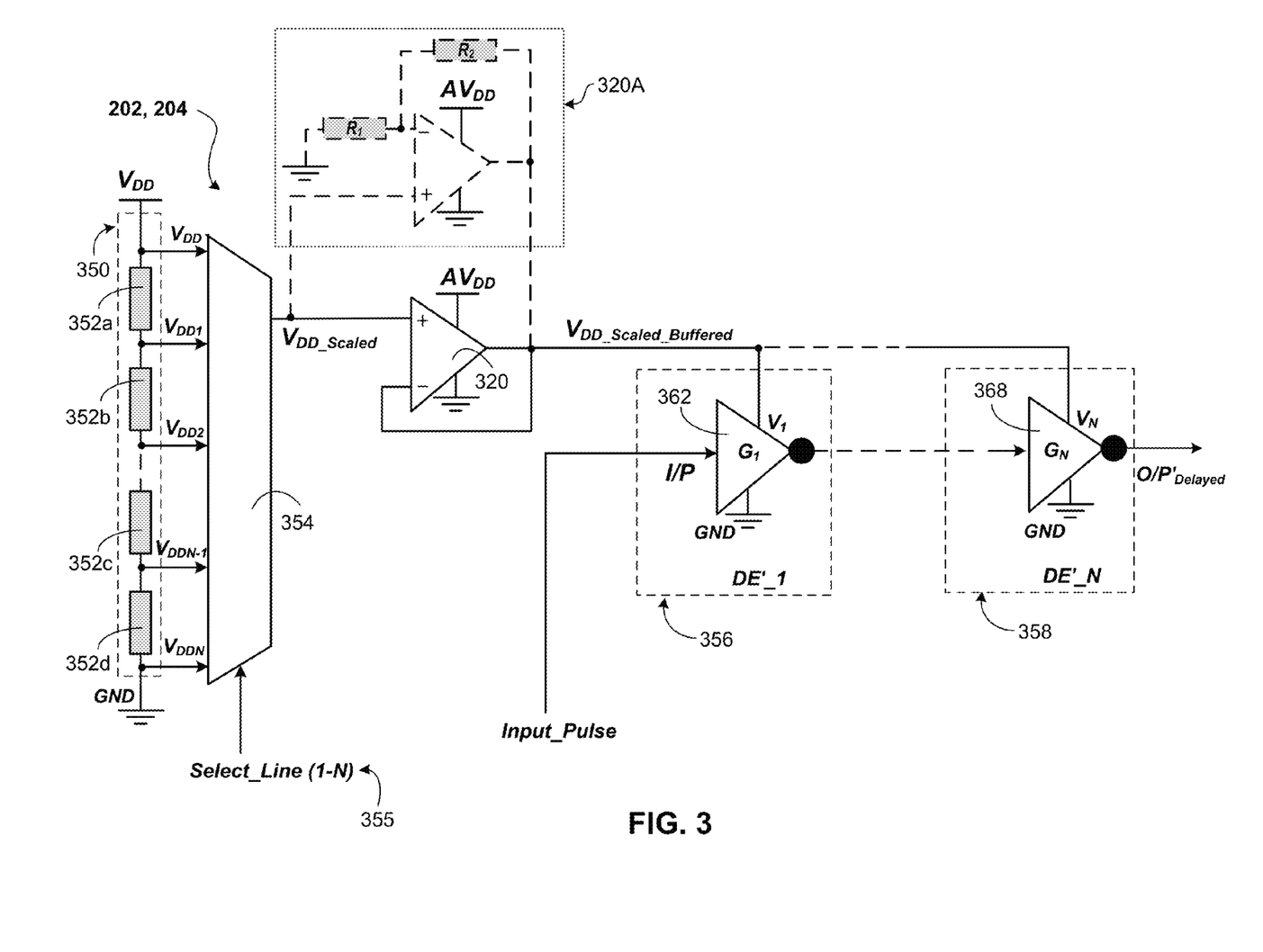
FIG. 3 is an alternative exemplary embodiment of a critical path monitoring (CPM) circuit utilized within the control circuit embodiment depicted in FIG. 2A.

FIG. 3 is another exemplary embodiment of the critical path monitoring (CPM) circuits 202, 204 utilized within the control circuit 200 embodiment depicted in FIG. 2A. The critical path monitoring (CPM) circuits 202, 204 may each include a resistor network 350, which includes a plurality of resistors 352a-352d that are connected in series between the digital supply V$_{DD}$ and ground GND. The resistor network 350 scales the voltage of the digital supply V$_{DD}$ to generate, for example, scaled supply voltages V$_{DD1}$, V$_{DD2}$ . . . V$_{DDN}$. For example, scaled supply voltage V$_{DD1}$ may include 90% of the digital supply V$_{DD}$, scaled supply voltage V$_{DD2}$ may include 80% of the digital supply V$_{DD}$, while supply voltage V$_{DDN}$ may include the highest scaling of about 20% of the digital supply V$_{DD}$. In general, for example, the scaled voltage supply may include a voltage value in the range of approximately the supply voltage (V$_{DD}$) down to about 20% of the supply voltage (V$_{DD}$).

The critical path monitoring (CPM) circuits 202, 204 also each include a selector device 354 such as a multiplexer that receives the scaled voltages generated by resistor network 350. The selector device 354 includes a select control line 355 that enable the selection of desired buffered scaled supply voltages. For example, if eight (8) scaled voltages are generated by the resistor network 350, a 3-bit select line may be needed to controllably select any one of the eight scaled voltages. If a scaled voltage corresponding to %90 of V$_{DD}$ is required, the select line 355 may, for example, be set to "001." If a scaled voltage of %80 of V$_{DD}$ is required, the select line 355 may, for example, be set to "010." If a scaled voltage corresponding to %70 of V$_{DD}$ is required, the select line 355 may, for example, be set to "011," etc.

The critical path monitoring (CPM) circuits 202, 204 of FIG. 3 may further include a unity gain buffer amplifier 320 and one or more serially connected delay elements such as delay element 356 (DE'_1) and delay element 358 (DE'_N). Each delay element introduces a time delay to a pulse signal (i.e., Input_Pulse) that propagates through it. For purposes of illustrative brevity, only the first delay element 356 and the last delay element 358 are depicted. However, between delay elements 356 and 358 any number of delay elements may be provided for emulating critical paths within the microprocessor. Each delay element may include an inverter logic gate delay stage. Thus, delay element 356 includes inverter logic gate delay stage 362, while delay element 358 includes inverter logic gate delay stage 368.

As further depicted, each scaled voltage output from the selector device 354 is coupled to supply voltages V$_1$-V$_N$ of each respective delay element DE'_1-DE'_N, respectively, via the unity gain buffer amplifier 320. Specifically, output V$_{DD\_Scaled\_Buffered}$ of the unity gain buffer amplifier 320 is coupled to the supply voltages V$_1$-V$_N$ of each respective delay element DE'_1-DE'_N. Thus, output V$_{DD\_Scaled\_Buffered}$ is coupled to the supply of both inverter logic gate delay stage 362 of delay element 356 and inverter logic gate delay stage 368 of delay element 358.

The selector device 354 may also output a V$_{DD}$ voltage as well as scaled voltages. By scaling the V$_{DD}$ supply voltage that is applied to the inverter logic gate delay stages, the tracking slope of the CPM circuits 202, 204 of FIG. 3 may, however, be increased, especially for delay paths emulating f$_{max}$ at lower supply voltage. Thus, the f$_{max}$ tracking sensitivity of the CPM circuits 202, 204 may be adjusted over a wider range of supply voltages operating within the microprocessor. However, the slope may also be decreased if buffer 320 provides positive gain so the output can scale higher than V$_{DD}$. In one exemplary implementation, unity gain buffer 320 can be replaced by buffer amplifier 320A, which may include a non-inverting amplifier having a positive gain value that is associated with the ratio of resistors R$_2$ and R$_1$. By having the ability to scale both above and below V$_{DD}$, the emulated path may be controllably adjust via the scaling voltage (i.e., V$_{DD\_Scaled\_Buffered}$) to provide steeper or shallower tracking slopes depending on the f$_{max}$ curve of the microprocessor.

During normal operation whereby no voltage droop is experienced, the delay path resulting from delay elements DE'_1 to DE'_N of each of the CPM circuits 202, 204 introduce a known predetermined delay. Each pulse corresponding to the microprocessor clock signal, as indicated by Input_Pulse, is received at input I/P of inverter logic gate delay stage 362 of delay element 356 (i.e., DE'_1). Each pulse may then propagate through the inverter logic gate delay 362 at delay element 356 (i.e., DE'_1) and through that of all subsequent delay elements until the pulses are output from the last delay element 358. At the last delay element 358 (i.e., DE'_N) in the delay path, each pulse therefore propagates through the inverter logic gate delay 368 and is thus received at the output of the inverter logic gate delay 368, as indicated by O/P'$_{Delayed}$.

Within each delay element, the inverter logic gates introduce a variable delay that changes based on the supply voltages that are applied to their respective supply voltages V$_1$-V$_N$. As described above, during normal operation whereby no voltage droop is experienced, the delay path resulting from delay elements DE'_1 to DE'_N of each of the CPM circuits 202, 204 (FIG. 3) introduce a known predetermined delay based on set supply voltages governed by V$_{DD\_Scaled\_Buffered}$. This predetermined delay experienced by each pulse at output O/P'$_{Delayed}$ is utilized along with the non-delayed version of these pulses by the edge detectors 206, 208 (FIG. 2A) to generate the multi-bit codes that control the DPLL 236 (FIG. 2A) and thus the microprocessor clock frequency via LCB clock generator 222 (FIG. 2A).

Upon the occurrence of voltage droop on the supply voltages, the V$_{DD\_Scaled\_Buffered}$ voltage also drops. This voltage drop is therefore experienced at the respective supply voltages V$_1$-V$_N$ of inverter logic gate delays G$_1$-G$_N$ of delay elements DE'_1 to DE'_N, respectively. This may cause the delay elements DE'_1, DE'_N to further introduce an additional time delay to that of the predetermined delay for each pulse. As described above in relation to FIG. 1A, when voltage droop occurs, the microprocessor clock frequency should also be backed-off to maintain the frequency guardband. Thus, the additional time delay is utilized by the edge detectors 206, 208 (FIG. 2A) to generate the multi-bit codes and reduce the microprocessor clock frequency via LCB clock generator 222 (FIG. 2A).

The delay elements DE'_1 to DE'_N of the CPM circuit of FIG. 3 includes a single inverter logic gate delay that varies the delay to each pulse based on supply voltage variations caused by, for example, voltage droop. However, the delay elements DE_1 to DE_N of the CPM circuit of FIG. 2B each include a transmission gate and an inverter logic gate delay, whereby the transmission gate varies the delay to each pulse based on supply voltage variations. In contrast, the delay elements DE'_1 to DE'_N of the CPM circuit of FIG. 3 have a single variable element (i.e., inverter delay) that is sensitive to supply variations. The delay elements DE_1 to DE_N of the CPM circuit of FIG. 2B, however, each include one variable delay element (i.e., transmission gate) that is sensitive to supply variations and one fixed delay element (i.e., inverter delay). Thus, the delay elements DE'_1 to DE'_N of the CPM circuit of FIG. 3 generate more sensitivity (i.e., tracking slope) compared to delay elements DE_1 to DE_N of the CPM circuit of FIG. 2B, based on the occurrence of a set voltage droop. Moreover, the CPM circuit of FIG. 3 creates an increased number of scaled supply voltages (i.e., $V_{DD\_Scaled}$) for the same resistor network compared to the CPM circuit of FIG. 2B.

The CPM circuit of FIG. 3 does, however, occupy more real estate on the microprocessor than the CPM circuit of FIG. 2B by virtue of having the buffer device 320. The buffer device 320 also requires an additional analog supply voltage $AV_{DD}$ in addition to $V_{DD}$. Thus, based on the availability of chip real estate and a need for more sensitivity (i.e., tracking slope), the CPM circuit of FIG. 3 may be implemented. Alternatively, when the CPM circuit is to occupy lesser space on the microprocessor and a relatively high-sensitivity is not required, the CPM circuit of FIG. 2B may be implemented. In some implementations, the control circuit of FIG. 2A may include the CPM circuits depicted in both FIG. 2B and FIG. 3. Although the logic gate delay stages are depicted and described as inverters, in alternative implementations, NAND and NOR gate delay stages may also be utilized. Generally, any type of CMOS or other type of gate delay may be employed.

As described above, the embodiment of FIG. 3 provides the means for scaling the supply voltage both above and below $V_{DD}$ to provide a wider range of tracking slope control. In relation to the embodiment of FIG. 2B, however, the $V_{DD}$ voltage 251 applied to selector 254 may also be increased by utilizing a charge pump 253. Thus, a charge pump may increase the $V_{DD}$ voltage at the selector in order to provide a wider range of $V_{DD-Scaled}$ and $GND_{scaled}$ voltage values which can both exceed $V_{DD}$ and be below $V_{DD}$. Therefore, as with FIG. 3, the embodiment of FIG. 2B may also provide a wider range of tracking slope control. Thus, by scaling above $V_{DD}$, the tracking slope reduces.

The range of scaled voltages may increase to about two-times $V_{DD}$ and reduce to 0V based on the delay element design. For example, the scaled supply voltage $V_{DD-Scaled}$ may be scaled up to two-times $V_{DD}$ and reduced down to 0V. Similarly, the scaled ground voltage $GND_{Scaled}$ may also be scaled up to $V_{DD}$ and reduced down to 0V. A scaling down may include reducing the supply voltage (e.g., 0.8V) from the $V_{DD}$ value (e.g., 1.0V), whereby increasing the scaling down may involve further reducing the $V_{DD}$ voltage value (e.g., 0.5V). A scaling up may include increasing the supply voltage (e.g., 1.2V) above the $V_{DD}$ value (e.g., 1.0V), whereby increasing the scaling up may involve further increasing above the $V_{DD}$ voltage value (e.g., 1.5V).

Figure 5:
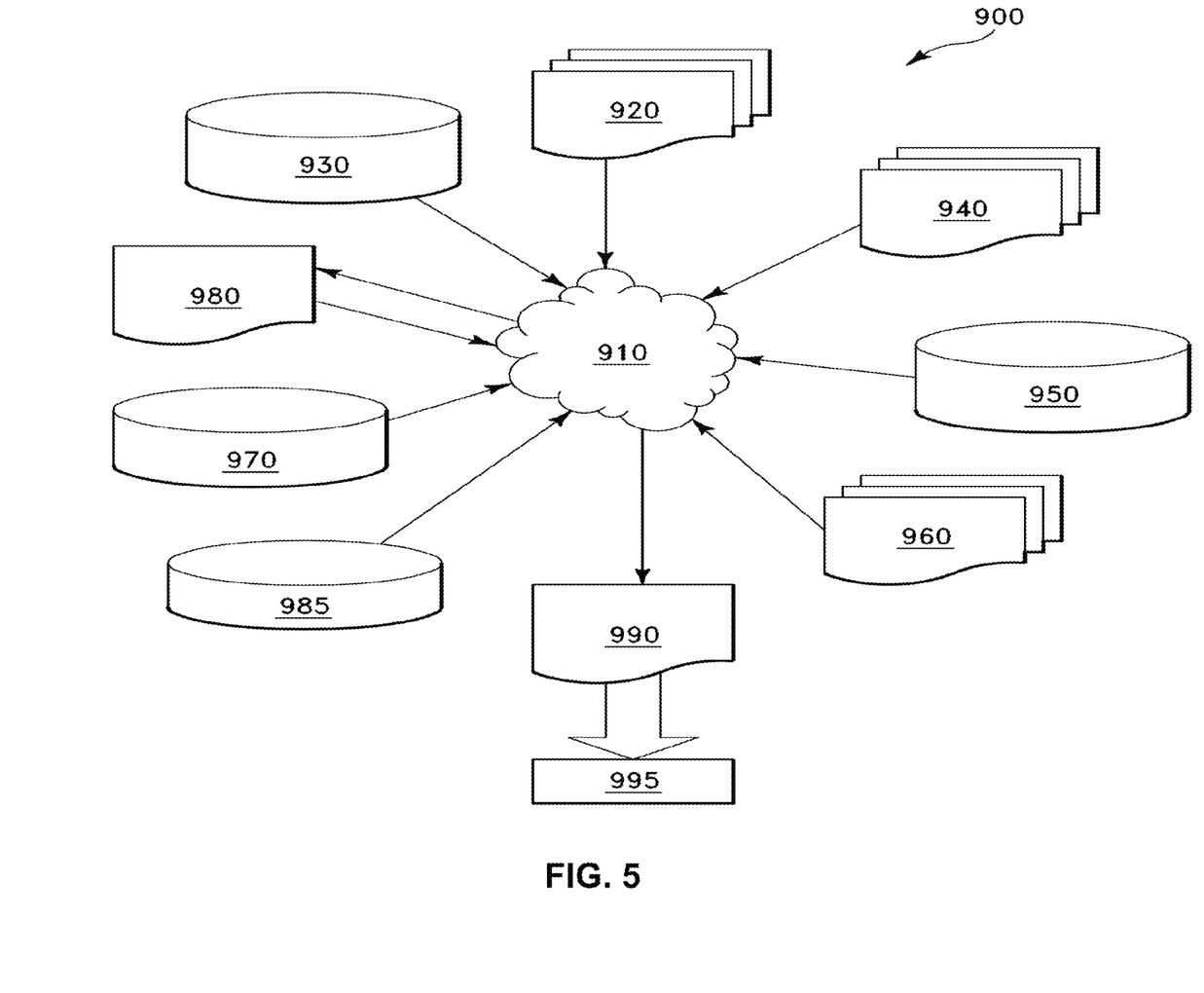
FIG. 5 is a flow diagram of a design process used in semiconductor design, manufacture, and/or test.

FIG. 5 shows a block diagram of an exemplary design flow 900 used for example, in semiconductor IC logic design, simulation, test, layout, and manufacture. Design flow 900 includes processes and mechanisms for processing design structures or devices to generate logically or otherwise functionally equivalent representations of the design structures and/or devices described above and shown in FIGS. 2A-2C and FIG. 3. The design structure processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems.

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by Altera® Inc. or Xilinx® Inc.

FIG. 5 illustrates multiple such design structures including an input design structure 920 that is preferably processed by a design process 910. In one embodiment, the design structure 920 comprises design data used in a design process and comprising information describing the embodiments of the invention with respect to the structures as shown in FIGS. 2A-2C and FIG. 3. The design data in the form of schematics or HDL, a hardware-description language (e.g., Verilog, VHDL, C, etc.) may be embodied on one or more machine readable media. For example, design structure 920 may be a text file, numerical data or a graphical representation of the one or more embodiments of the invention shown in FIGS. 2A-2C and FIG. 3. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as that shown in FIGS. 2A-2C and FIG. 3. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structure shown in FIGS. 2A-2C and FIG. 3 to generate a netlist 980 which may contain a design structure such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 20, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990 comprising second design data embodied on a storage medium in a data format used for the exchange of layout data of integrated circuits and/or symbolic data format (e.g. information stored in a GDSII (GDS2), GL1, OASIS, map files, or any other suitable format for storing such design structures). In one embodiment, the second design data resides on a storage medium or programmable gate array in a data format used for the exchange of data of mechanical devices and structures (e.g. information stored in an IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of the embodiments of the invention shown in FIGS. 2A-2C and FIG. 3. In one embodiment, design structure 990 may comprise a compiled, executable HDL simulation model that functionally simulates the devices shown in FIGS. 2A-2C and FIG. 3.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce devices or structures as described above and shown in FIGS. 2A-2C and FIG. 3. Design structure 990 may then proceed to a stage 995 where, for example, design structure 990: proceeds to tape-out, is released to manufacturing, is released to a mask house, is sent to another design house, is sent back to the customer, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. A circuit for monitoring and controlling a clock signal generated by a clock source in a microprocessor device, the circuit comprising:
    a voltage divider network that provides a plurality of voltages;
    a selector device that receives the plurality of voltages and provides a scaled supply voltage and a scaled ground voltage selectable from the received plurality of voltages; and
    at least one delay element that receives the scaled supply voltage and the scaled ground voltage and generates a delayed pulse signal by applying a delay to each pulse of the clock signal, the delayed pulse signal having a delay magnitude controllable by the scaled supply voltage and the scaled ground voltage,
    an edge detector circuit that receives the delayed pulse signal and each pulse of the clock signal, the edge detector generating a multi-bit code based on the delay magnitude of the delayed pulse signal relative to each pulse of the received clock signal; and
    a digital phase locked loop that receives the multi-bit code from the edge detector and generates a frequency correction signal based on a variation to a supply voltage of the microprocessor device,
    the frequency correction signal being applied to the clock source to maintain a frequency guardband for the clock signal of the microprocessor during the variation to the supply voltage.

2. The circuit of claim 1, wherein the voltage divider network comprises a plurality of resistors connected between the supply voltage of the microprocessor and a ground voltage of the microprocessor.

3. The circuit of claim 1, wherein:
    the scaled ground voltage comprises a voltage value in a range of from about zero volts up to about the supply voltage; and
    the scaled supply voltage comprises a voltage value in a range of from about twice the supply voltage down to about zero volts.

4. The circuit of claim 1, wherein the selector device comprises a selector input that selects the scaled supply voltage and the scaled ground voltage from among the received plurality of voltages, the scaled supply voltage and the scaled ground voltage providing an increased frequency per supply voltage variation slope as a function of an increased scaling down, and the scaled supply voltage and the scaled ground voltage providing a decreased frequency per supply voltage variation slope as a function of an increased scaling up.

5. The circuit of claim 1, wherein each of the at least one delay element comprises:
a transmission gate; and
a logic gate coupled to the transmission gate.

6. The circuit of claim 5, wherein the transmission gate comprises an n-type field effect transistor (NFET) and a p-type field effect transistor (PFET) that enable and disable a signal transmission path between an input terminal and an output terminal, the scaled supply voltage being coupled to a gate of the NFET, the scaled ground voltage being coupled to a gate of the PFET, and the clock signal being coupled to the input terminal for transmission to the output terminal.

7. The circuit of claim 6, wherein the logic gate comprises an inverter having an input and an output, the inverter providing a finite propagation delay between the input and the output.

8. A circuit for monitoring and controlling a clock signal generated by a clock source in a microprocessor device, the circuit comprising:
a voltage divider network that provides a plurality of voltages;
a selector device that receives the plurality of voltages and provides a scaled supply voltage selectable from the received plurality of voltages; and
a delay path that receives the scaled supply voltage and generates a delayed pulse signal by applying a delay to each pulse of the clock signal, the delayed pulse signal having a delay magnitude controllable by the scaled supply voltage,
an edge detector circuit that receives the delayed pulse signal and each pulse of the clock signal, the edge detector generating a multi-bit code based on the delay magnitude of the delayed pulse signal relative to each pulse of the received clock signal; and
a digital phase locked loop that receives the multi-bit code from the edge detector and generates a frequency correction signal based on a variation to a supply voltage of the microprocessor device,
the frequency correction signal being applied to the clock signal to maintain a frequency guardband for the clock signal of the microprocessor during the variation to the supply voltage.

9. The circuit of claim 8, wherein the delay path comprises:
a buffer amplifier that receives the scaled supply voltage and generates a buffered scaled supply voltage; and
at least one delay element having a voltage supply that receives the buffered scaled supply voltage, the at least one delay element providing the delay magnitude based on the buffered scaled supply voltage.

10. The circuit of claim 9, wherein the at least one delay element comprises at least one of an inverter, a NAND gate, and a NOR gate.

11. The circuit of claim 8, wherein:
the buffered scaled supply voltage comprises a voltage value in a range of from about two times the supply voltage down to about 0 volts.

12. The circuit of claim 8, wherein the selector device comprises a selector input that selects the scaled supply voltage from among the received plurality of voltages, the scaled supply voltage providing an increased frequency per supply voltage variation slope as a function of an increased scaling down, and the scaled supply voltage providing a decreased frequency per supply voltage variation slope as a function of an increased scaling up.

13. The circuit of claim 8, wherein the voltage divider network comprises a plurality of resistors connected between the supply voltage of the microprocessor and a ground voltage of the microprocessor.

14. A method of monitoring and controlling a clock signal generated by a clock source in a microprocessor device, the method comprising:
generating a plurality of scaled voltages;
selecting at least one scaled voltage from the generated plurality of scaled voltages;
applying the at least one scaled voltage to at least one delay element;
delaying each pulse of the clock signal propagating through the at least one delay element based on the selected at least one scaled voltage;
generating a frequency correction signal from the delaying of each pulse of the clock signal based on a variation to a supply voltage of the microprocessor;
receiving, at an edge detector circuit, the delayed pulse signal and each pulse of the clock signal, and generating a multi-bit code based on the delay magnitude of the delayed pulse signal relative to each pulse of the received clock signal; and
receiving, at a digital phase locked loop, the multi-bit code from the edge detector and generating a frequency correction signal based on a variation to a supply voltage of the microprocessor device, and
applying the frequency correction signal to the clock source for maintaining a frequency guardband for the clock signal of the microprocessor during the variation to the supply voltage.

15. The method of claim 14, wherein the selecting of the at least one scaled voltage provides an increased frequency per supply voltage variation slope as a function of an increased scaling down.

16. The method of claim 15, wherein the selecting of the at least one scaled voltage provides a decreased frequency per supply voltage variation slope as a function of an increased scaling up.

17. The method of claim 14, wherein the generating of the plurality of scaled voltages comprises generating a voltage value in a range of from about twice the supply voltage down to about 0 volts.

18. The circuit of claim 1, wherein the edge detector circuit comprises:
a bank delay gates adapted to receive the delayed pulse signal for propagation along the bank of delay gates during a pulse period of said clock signal;
a bank of flip-flop devices coupled to the bank of delay gates, the bank of flip-flop devices receiving each pulse period of the clock signal, an output of a delay gate of the bank of delay gates being coupled to an input of a corresponding flip-flop device associated with the bank of flip-flop devices, wherein output logic values are generated at one or more outputs of the bank delay gates based on a time delay difference between each clock pulse and each delayed pulse signal received.

19. The method of claim 14, wherein the generating the multi-bit code at the edge detector circuit comprises:
inputting the delayed pulse signal to a bank of delay gates for propagation along the bank of delay gates during a pulse period of said clock signal;
inputting each pulse period of the clock signal to a bank of flip-flop devices coupled to the bank of delay gates, an output of a delay gate of the bank of delay gates being coupled to an input of a corresponding flip-flip device associated with the bank of flip-flop devices, wherein output logic values are generated at one or more outputs of the bank of delay gates based on a time delay difference between each clock pulse and each delayed pulse signal received.

20. The circuit of claim 8, wherein the edge detector circuit comprises:
- a bank of delay gates adapted to receive the delayed pulse signal for propagation along the bank of delay gates during a pulse period of said clock signal;
- a bank of flip-flop devices coupled to the bank of delay gates, the bank of flip-flop devices receiving each pulse period of the clock signal, an output of a delay gate of the bank of delay gates being coupled to an input of a corresponding flip-flip device associated with the bank of flip-flop devices; and
- generating an output logic value at one or more outputs of the bank of delay gates based on a time delay difference between each clock pulse and each delayed pulse signal received.

* * * * *